Inventor
John O. Almen
By Blackmore, Spencer & Flint
Attorneys

Inventor
John O. Almen

Patented Apr. 12, 1938

2,113,638

UNITED STATES PATENT OFFICE 2,113,638

CONTROL MEANS FOR TOROIDAL RACE AND ROLLER POWER TRANSMISSION MECHANISM

John O. Almen, Royal Oak, Mich., assignor to General Motors Corporation, Detroit, Mich., a corporation of Delaware Application August 6, 1936, Serial No. 94,564

16 Claims. (Cl. 74—200)

This invention relates to variable speed-ratio toroidal race and roller transmission mechanism, and particularly to means for varying the transmission ratio and means for automatically reversing the sense of effective movement of said ratio varying means in response to changes in the sense of rotation of the transmission mechanism.

Objects of the invention are to simplify the construction of variable speed ratio control means for race and roller transmission mechanisms; to render the operations of such ratio-control means positive and reliable; to adapt the control mechanism for either external control directly of all the rollers of a set, or for external control of a master roller, which in turn effects control of the other or follower rollers of a set to exactly the same degree as the control exerted on said master roller, and to otherwise improve transmission mechanisms of race and roller type.

In toroidal race and roller power transmission mechanisms comprising coaxial races and interposed rollers it is known that the rollers may be steered easily to new ratio positions with respect to the races, even when squeezed between the races under heavy pressure, by inclining said rollers around an axis connecting the points of contact of the roller with the races. This movement is herein designated a roller inclining movement. Following such inclination the rollers spiral inward on one race and outward on the other, according to the sense of rotation, and thus assume different angular positions with respect to the race axis, the rollers tilting about an axis which is perpendicular to the axis of rotation of the roller and parallel with the planes of rotation of the races. This angular movement of the rollers in assuming new ratio positions is herein referred to as tilting of the rollers. When a roller has been inclined its axis of rotation has moved out of the axial plane that includes the roller center and the axis of the races and must be restored into that plane when the roller has tilted to the desired ratio position, as otherwise the roller would continue to spiral until it ran off the raceways if no obstacles were interposed, and in any event it would be impracticable to secure accuracy of adjustment. Means for restoring the axis of rotation of the roller following inclination is herein referred to as restoration means.

The invention comprises in a race and roller transmission mechanism a roller; a pivoted carrier in which the roller rotates, the carrier being movable a limited extent about its pivot and longitudinally of the roller axis, and means for moving the carrier longitudinally of the roller axis comprising a control lever having a sliding fulcrum on a part rotating with the roller and pivoted to the carrier at the point of power application of the lever, the fulcrum of said lever being reversible from one side of the roller axis to the opposite side, and means to operate said lever whereby to incline the roller. It also includes means for simultaneously actuating the control levers of a plurality of rollers of a set, and means for reversing the positions of the control levers in response to reversals of the sense of rotation of races and rollers. It further includes the adaptation of said control mechanism to a master roller and means actuated by the tilting of the master roller to adjust the ratio position of one or more follower rollers to the same degree; also various details of construction as disclosed in the drawings and the descriptive part of the specification following.

In the drawings, in which like parts are identified by like reference characters, Fig. 1 represents an axial section through a fragment of a transmission mechanism embodying one form of this invention;

Figure 2:
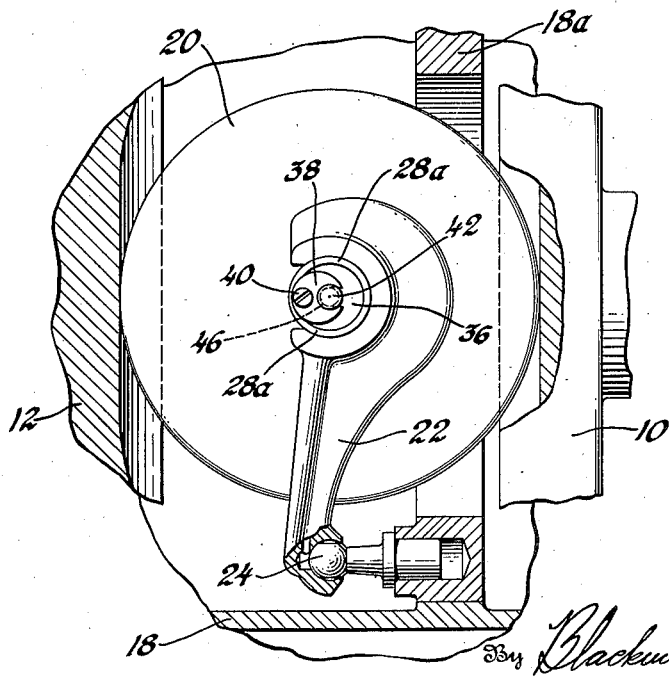
Fig. 2 is a view in partial section showing a roller carrier and a roller seen as if looking at the outer end of the roller arbor toward the race axis.

Each roller 20 is rotatably supported in a carrier 22, which, as shown in Fig. 2, may be a forked carrier moored at one end by a universal swiveling joint 24 to a transverse supporting frame 18a which is fixed to the housing 18 and is of a type fully illustrated and described in United States Patent No. 2,014,928. Each roller in the form of the invention illustrated is integral with or fixed to an arbor 26, rotatable in bearing bushings 28, 28a which are seated and pinned securely in the notched ends of the limbs of said forked carriers. The limbs of each carrier are so spaced with respect to the arbor and roller that each carrier is capable of a limited movement along said arbor for the purpose of inclining the rollers about an axis connecting the points of contact of the rollers with the races, in order to initiate tilting of the rollers to new ratio positions, the carrier being adapted to swing in a plane that includes the carrier pivot and the roller axis, as fully disclosed in said patent.

In normal driving, the axis of each roller lies in a plane which includes the race axis and the roller center; and when a roller is steered to a different ratio position the roller axis is displaced from said axial plane and must be restored. The means for inclining the rollers and so displacing the axes out of said axial planes and restoring the roller axes into the proper axial planes after ratio adjustment during either forward or reverse driving, to be presently described, is quite different from the corresponding means shown in said patent and constitutes the chief characteristic of this invention.

Figure 1:
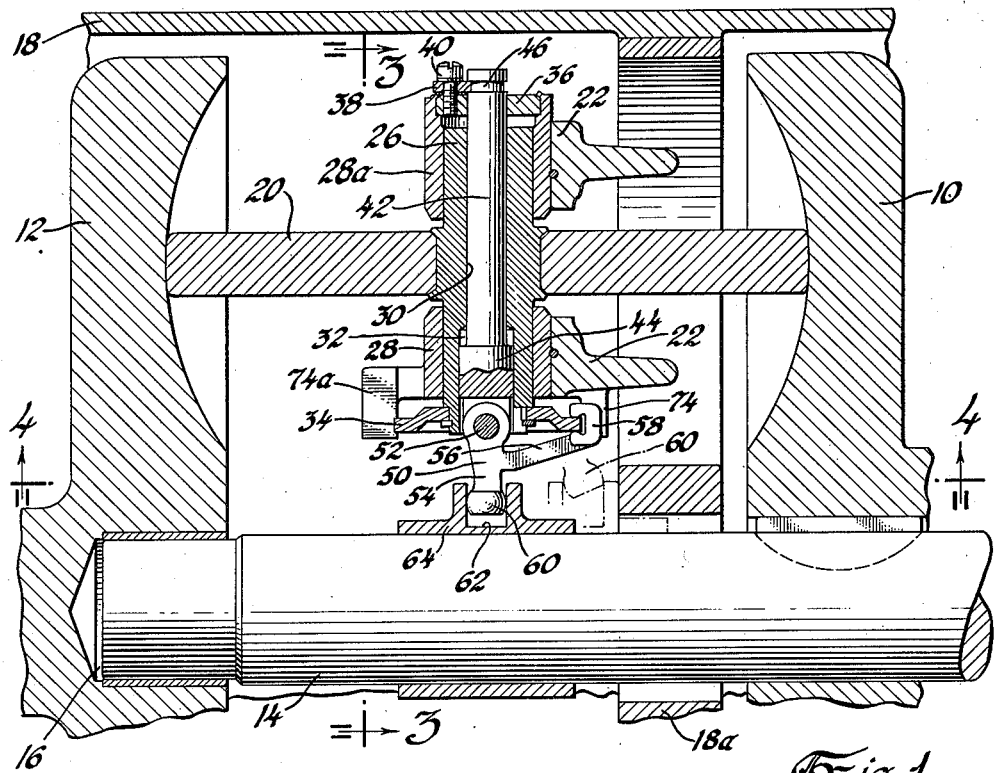
Fig. 1 illustrates somewhat schematically a variable speed power transmission mechanism comprising two toric races in axial alinement, interposed adjustable rollers, and means for controlling the ratio position of the rollers. For purposes of illustration and explanation race 10 may be considered the driving race rotated by a prime mover and race 12 a driven race. Race 10 is shown as keyed to shaft 14 which is piloted at one end in a central bearing cavity 16 in race 12 or the shaft to which it is fast, and is otherwise supported in bearings, not shown, in housing 18. Rollers 20 disposed between the races 10 and 12, in tractive contact with the raceways of both, transmit the rotation of the driving race to the driven race.

In the form of the invention illustrated in Fig. 1, the arbor 26 of each roller 20 is drilled to form a bore 30 and counterbored at the inner end, or end near the shaft 14, as at 32. Said inner end of the arbor projects toward shaft 14 beyond the inner bearing bushing 28 and is equipped with a wide circular control flange 34, shown as sleeved over the end of the arbor and secured rigidly to it. The arbor 26 and flange 34 rigidly united to the roller 20 are constituent members of the roller 20.

The outer end of bearing bushing 28a is closed by a disk plug 36 which is fitted in a counterbore in the bushing and secured therein as by peening, spinning or otherwise forcing metal of the bushing over the edge of the disk as illustrated in Fig. 1. Disk plug 36 has a central perforation alined with the bore of arbor 26 and carries a crescent locking key 38, fastened as by a machine screw 40 at one side of the central perforation, for securing to the carrier a control pin 42 fitting within the bore 30 of the arbor 26 and extending through the central perforation in plug 36. Said pin has an enlarged piston-like end 44 seated within the counterbore 32 for damping purposes; it is locked from longitudinal movement relative to the carrier 22 by said key 38 engaging in a locking groove 46 in the outer end which projects through the plug 36 as illustrated in Fig. 1 thereby permitting relative rotation of carrier and pin. The carrier 22 may be swung around its mooring joint 24 in a plane transverse of the shaft 14 thereby sliding the bearing bushings on the ends of the arbor and sliding the control pin 42 within the arbor, the effect being to incline the roller in one sense or the other around an axis connecting the points of contact of the roller with the raceways and thus displace its axis out of the axial plane in which it rests normally.

The means for swinging the carrier so as to cause the bearing bushings 28, 28a and control pin 44 to slide longitudinally of the arbor 26 will now be described.

Figure 3:
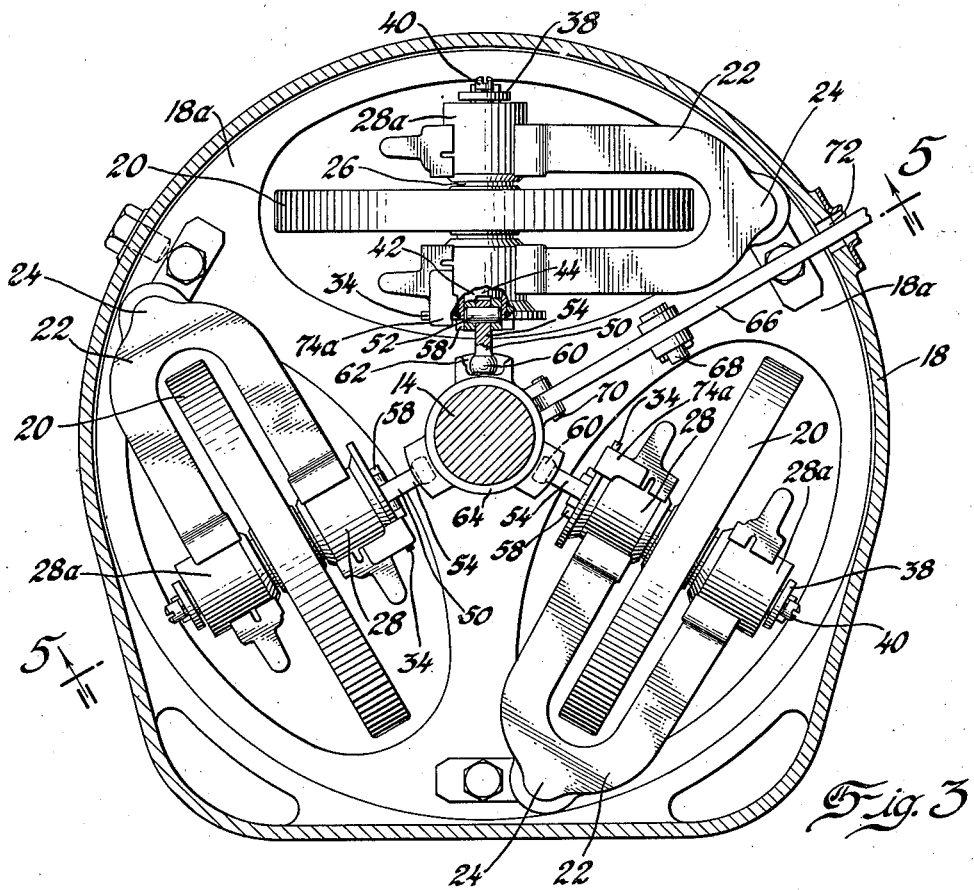
Fig. 3 shows a cross-section on line 3—3 of Fig 1.
Figure 5:
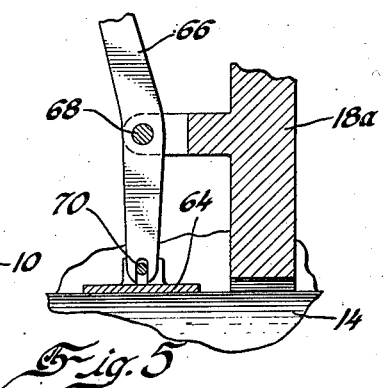
Fig. 5 is a sectional view on line 5—5 of Fig. 3 showing a fragment of a slidable control or actuating collar and means for sliding it.

A control lever 50 is pivoted at 52 to the inner end of control pin 42 as shown in Fig. 1. Lever 50, in the form of a bell crank, has a power arm 54 and a work arm 56. Work arm 56 extends laterally from power arm 54, and terminates in a hook-like or grooved element 58 engaged with the circular flange 34, the edge of the latter fitting and sliding within the groove. There is, therefore, a sort of slipping or swiveling connection between the lever 50 and the arbor 26, which does not interfere with the rotation of the roller nor cause the lever to rotate with said roller except between limiting stops as will be presently made clear. The end 60 of power arm 54 is shown of spheroidal form seated within a groove 62 formed in a control collar or actuator 64 that is slidable axially on shaft 14. The collar 64 may be moved axially in one sense or the other by any suitable means. A conventional means for sliding said collar is shown in Figs. 3 and 5 as a lever 66 pivoted at 68 on frame 18a, the inner end of said lever having a pin and slot or equivalent connection with the control collar at 70 and the outer end extending through an opening 72 in the housig 18 to the exterior. When the power arm 54 is in line with the axis of pin 42, as shown in Fig. 1, the axis of the roller lies in the axial plane that includes the race axis and roller center.

Figure 4:
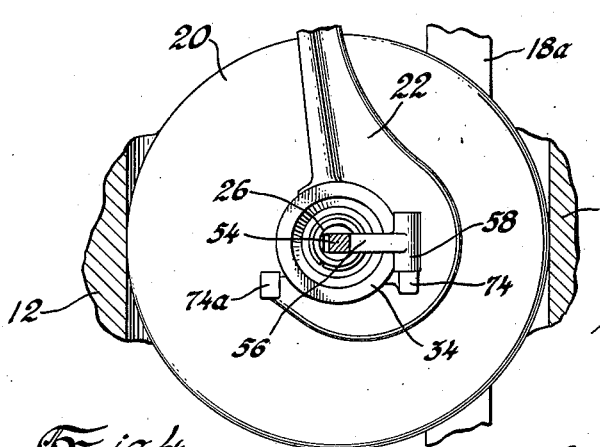
Fig. 4 represents a section on line 4—4 of Fig. 1, showing a roller and fragment of a roller carrier viewed as if looking at the inner end of the roller axis in the direction of the arrows with control lever in position assumed during forward driving.

Control pin 42 and lever 50 are also swiveled to carrier 22 and tend to rotate with arbor 26 except as prevented by stop devices, fixed to carrier 22 and projecting into the circumference occupied by the grooved flange-engaging element 58 on lever 50. In Figs. 1 and 4 said stops are indicated by numerals 74 and 74a and are disposed on the carrier on the sides of the roller axes that are more remote from the swiveling mooring joint 24.

Let it be assumed that race 10 is the driving race rotating counterclockwise as viewed in Fig. 3 or from the left of Fig. 1. The rollers are then rotating counterclockwise as seen when looking at the outer ends of the roller arbors toward the center of shaft 14. The tendency of control pin 42 is to rotate with the roller owing to the friction between the pin and the roller arbor and between flange 34 and element 58; and it does so until the element 58 reaches stop 74, as indicated in Figs. 1 and 4. In Figs. 1 and 4 element 58 is shown bearing against stop 74 as in forward driving.

If now, while the transmission is being driven forward with race 10 and each roller 20 rotating as stated in the preceding paragraph, the control collar 64 be moved to the right or toward the driving race (Fig. 1) the levers 50 will fulcrum on the edges of flanges 34 on the sides nearest the race 10, since the flanges are fixed with respect to the rollers, which are firmly pinched between races 10 and 12, and hence said levers will pull control pins 42 inward thus swinging the carriers inward around the universal pivots 24 which are on the sides of the roller axes from which the driving race approaches, and so displacing the roller axes that the rollers will be steered outward on driving race 10 and inward on driven race 12. Rightward movement of control collar 64 as viewed in Fig. 1, or movement of said control collar toward race 10 during forward driving therefore adjusts the transmission into a higher ratio of output to input speed under the assumption that race 10 is the driving race rotating as stated. Movement of control collar in the opposite sense obviously adjusts the transmission mechanism to a lower ratio of input to output speed.

If the sense of rotation of the driving race should be reversed and race 10 rotate clockwise as viewed in Fig. 3 or from the left in Fig. 1, and rollers 20 rotate clockwise as viewed when looking from the outside toward the axis of shaft 14, then each control pin 42 and flange 34 will also tend to rotate clockwise and will by reason of the friction between pin and arbor and between flange 34 and element 58 on lever 50 carry said lever into a position diametrically opposite that which it occupies as shown in full lines in Figs. 1, 3 and 4, the element 58 then being in contact with stop 74a.

Now with the transmission mechanism rotating in reverse, as described, a movement of control or actuating collar 64 toward race 10 causes the roller-supporting end of each carrier 22 to swing in the plane that includes the pivot and the roller axis outward away from shaft 14 and thereby incline the rollers in the sense of inclination opposite to that imparted by the same movement of collar 64 when the transmission was driving forward. As the race 10 is now rotating reversely the rollers will be steered outward on race 10 and inward on race 12, and the transmission will be adjusted to a higher ratio of output to input speed in reverse. Movement of collar 64 in the opposite sense will adjust the rollers into lower speed ratio position.

When a roller is inclined or otherwise shifted so as to cause its axis of rotation to become displaced from the axial plane that includes the race axis and roller center it will continue to spiral on the races until the axis of rotation is restored to said radial plane. In the construction illustrated, since the tilting or ratio changing movement of the roller is in the same sense as that of the lever 50 it will be apparent that as a roller tilts or changes its ratio position it will react upon the lever 50 causing the latter to swing the carrier back and restore the roller axis to its normal position in the said axial plane at which time the power arm 50 again comes into axial alinement with pin 42. The extent of the restoration movement of the roller axis exactly cancels the movement of displacement. And this restoration movement takes place automatically whether the transmission mechanism is rotating in one sense or the opposite.

In the form of the invention shown in Figs. 1 to 5, inclusive, already described, all of the rollers are adjustable simultaneously by sliding the collar 64, the latter being connected similarly to each of the levers 50, and the control effort being equally divided among the three rollers.

Figure 6:
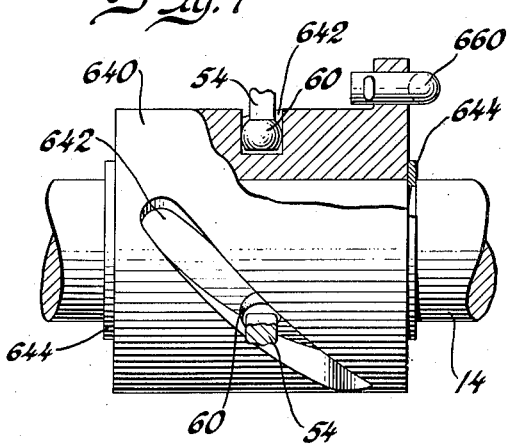
Fig. 6 shows a modified form of control or actuating collar.
Figure 8:
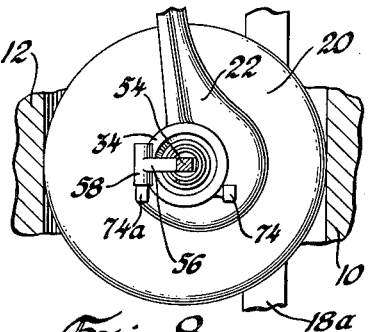
Fig. 8 is a view similar to Fig. 4 showing the control lever in position assumed during reverse driving.

Slidable collar 64 may be replaced by an oscillatable collar 640 (Fig. 6) provided with helical slots 642 in which the terminals 60 of the power arms 54 of control levers 50 are engageable. Collar 640 is prevented from moving longitudinally as by snap rings 644 at each end seated in grooves in shaft 14. Any suitable means for rotating collar 640 from the exterior of the transmission housing it will be understood are to be provided. Such a means may be, for example, a lever or push rod as indicated at 660 connected by a pin to the collar. When changing ratio with rotatable collar 640 having helical slots pitched as illustrated, a clockwise rotation of the collar (viewed from the left of Fig. 6) results in a tilting of the rollers into a lower speed ratio position, and a counterclockwise rotation results in a tilting to a higher speed ratio position.

Figure 7:
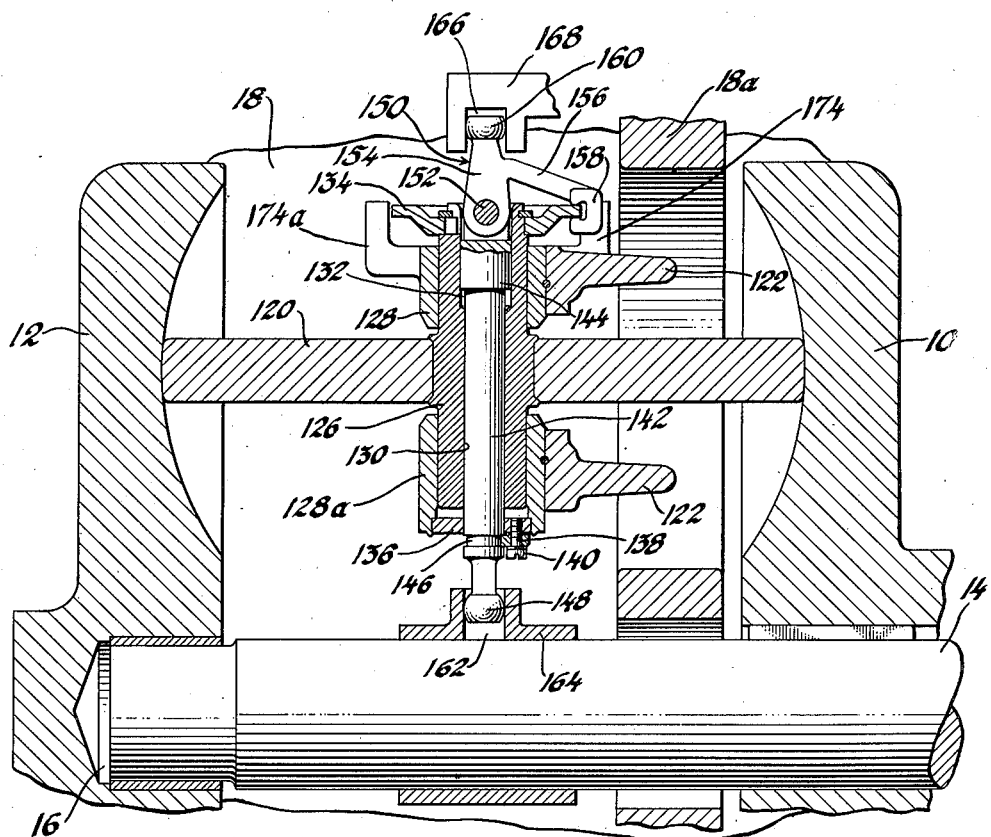
Fig. 7 represents an axial section disclosing another form of the invention embodying an externally controlled master roller.

In the form of the invention illustrated in Fig. 7 the control effort is applied to one roller only, namely to a master roller 120. When the master roller has been inclined the follow rollers immediately assume the same inclination in response to the resulting tilting movement of the master roller. This form of the invention has the advantage that less external effort is required to incline the master roller than to incline all of the rollers at the same time—as is necessary in that form of the invention illustrated in Figs. 1 to 6 inclusive.

The means for inclining the master roller are similar to those for inclining the rollers previously described but are positioned at the outer end of the roller axis of rotation instead of at the inner end.

Master roller 120 has fixed to it an arbor 126 having a bore 130 and a counterbore 132, the counterbore being at the outer end of the arbor instead of at the inner end as in arbor 26 previously described. The outer end of the arbor carries a control flange 134, fixedly connected to it, similar to control flange 34 connected to the inner end of arbor 26 before described.

Bearing bushings 128 and 128a are pinned in the notched free ends of the limbs of carriers 122, each of which is pivoted to the frame 18a on the advancing side of the roller axis with reference to the movement of race 10 during forward driving. Arbor 126 is journalled in the bearing bushings, which are spaced apart far enough to permit relative movement of the carrier with respect to the arbor lengthwise of the latter. The inner end of bushing 128a is closed by a disk plug 136, similar to the disk plug 36, similarly firmly secured in the bushing, and similarly centrally perforated and equipped with a crescent-like key 138 secured by a machine screw 140 at one side of the central perforation in the plug.

A control pin 142 fits rotatably within the bore 130, the outer end of said pin having an enlarged piston-like part 144 fitting within the counterbore 132. The inner end of pin 142 extends through plug 136 and has a circumferential groove 146 engaged by crescent-key 138 to permit rotation of the pin with respect to the carrier but prevent relative movement of carrier and pin lengthwise of the pin, whereby any longitudinal movement of the pin will move the ends of the carrier limbs lengthwise of arbor 126. The control pin 142 extends further inward beyond groove 146 terminating in a spheroidal end 148 seated in a slot 162 in automatic control collar 164. The outer end of control pin 142 has pivoted to it at 152 a control lever 150 having a power arm 154 and a work arm 156 extending laterally from said power arm, said work arm terminating in a hook-like grooved element 158 engaging the edge of control flange 134, and said power arm ending in a spheroidal enlargement 160 seated in a notch 166 in an externally controlled actuator 168. In the form shown in Fig. 7 the power arm 154 is in line with the axis of pin 142 when the roller axis is in its normal position in the axial plane including the race axis and roller center.

Fig. 7 shows the carrier in cross section through the axis of the bearings 128, 128a. On the portion of the carrier to the left of this axis (as viewed from the left of Fig. 7), are two stops 174 and 174a. This figure shows the hook-like end 158 of control lever arm 156 against the near side of stop 174, which is the position it would assume if roller 120 were rotating counterclockwise viewed from the outside looking at the outer end of the arbor 126 toward the axis of shaft 14. This is the direction of roller rotation during forward driving under the assumption that race 10 is the driving race rotating counterclockwise, as viewed from the left of the figure. The element 158 takes the position shown owing to the friction between the arbor 126, and its flange 134 on the one hand, and pin 142 and element 158 on the other, as has been explained hitherto with respect to the form of invention shown in Figs. 1 to 4.

Assuming that the driving race is rotating as described then, if the actuator 168 be moved leftward as viewed in Fig. 7, that is toward the driven race 12, lever 150 will fulcrum on the flange 134 and control pin 142 will be moved inward thus swinging the free end of carrier 122 inward and thereby inclining the roller about the line connecting its points of contact with the races so as to steer it toward a high ratio position, that is, outward on race 10 and inward on race 12. As the roller 120 tilts during the spiraling of the roller to a higher speed ratio position, the control pin tilting with it will slide control collar 164 rightward, as viewed in Fig. 7, that is toward the race 10.

The follower rollers, which are precisely like the rollers illustrated in Figs. 1 and 3, and are adjusted by mechanism such as shown therein are connected with said collar 164 by the control levers 50, control pins 42 and flanges 34, and are therefore inclined to the same extent as was the master roller 120 so that they assume the same ratio position as the master roller. It will be remembered that a movement of the control collar 64 to the right as viewed in Fig. 1, that is toward driving race 10, caused the rollers to assume a high ratio position during forward driving. So when, as just described, the master roller tilts toward high it shifts control collar 164 toward race 10 so that the follower rollers follow the master roller into the same high speed ratio position.

If external control device 168 is moved rightward during forward drive, as viewed in Fig. 7, that is toward driving race 10, it is obvious that the rollers will spiral toward low ratio position.

Should the rotation of driving race 10 be reversed the hook-like end 158 of arm 156 of control lever 150 will be rotated clockwise (looking at the outer end of arbor 126 toward shaft 14) until it is stopped by stop 174a, whereupon movement of actuator 168 toward race 12 will again adjust the master roller into high speed ratio in reverse, and tilting of said master roller will effect a similar ratio change in the follower rollers. Movement of actuator 168 toward race 10 will adjust the rollers into low speed ratio in reverse.

The invention is shown applied to a single unit race and roller transmission mechanism composed of two races and one set of interposed rollers, but it is equally well adapted to duplex race and roller mechanisms including two sets of races and two sets of rollers operating in parallel.

I claim:

1. In a variable speed toroidal race and roller power transmission mechanism, the combination of a frame, a roller, a roller arbor immovable axially of the roller, a carrier in which the roller and arbor are mounted so as to permit axial movement of the carrier with respect to the arbor, said carrier having a universal connection with the frame allowing swinging movement of the carrier, a control lever having spaced apart connections with said carrier and arbor for imparting relative movement of the carrier axially with respect to the arbor.

2. In a variable speed toroidal race and roller power transmission mechanism, the combination of a frame, a roller, a roller arbor immovable axially of the roller, a carrier in which the roller and arbor are mounted so as to permit relative axial movement of the carrier with respect to the arbor, said carrier having a universal connection with the frame allowing swinging movement of the carrier, a control lever having a swiveling and pivotal connection with the carrier, and means spaced from said pivotal connection for connecting said lever to the arbor at either of two diametrically opposite points on the latter.

3. In a variable speed toroidal race and roller power transmission mechanism, the combination of a frame, a roller, a roller arbor immovable axially of the roller, a carrier in which the roller and arbor are mounted so as to permit axial movement of the frame with respect to the arbor, said carrier having a universal connection with the frame allowing swinging movement of the carrier, a control lever swiveled to the carrier and having an offset arm connected to the arbor for moving frame and arbor relatively in a direction of the roller axis, and means for rotating the lever so as to reverse the sense of force applied to arbor and carrier in response to movement of the power arm of said lever in the same sense.

4. In a variable speed toroidal race and roller power transmission mechanism, the combination of a frame, a roller, an arbor to which the roller is fixed, a carrier in which the roller and arbor are rotatively mounted with provision for relative axial movement of carrier and arbor axially of the latter, means for universally supporting the carrier on the frame so that it may swing in a plane including its pivot and the roller axis and rotate about an axis in that plane, and a control lever swiveled to the carrier and mounted at one point of the lever to swing transversely of the swiveling axis and slidingly connected to the arbor at another point of the lever to allow the latter to rotate with respect to the lever connected thereto for causing the carrier to swing and move axially of the roller in order to incline the latter.

5. A combination as defined in claim 4 in which the carrier is equipped with stops arranged to limit the amplitude of rotation of said lever with the arbor when the sense of rotation of the latter changes.

6. In a variable speed toroidal race and roller power transmission mechanism, the combination of opposed toroidal races, a plurality of rollers engaging said races, an arbor for each roller immovable axially with respect thereto, a roller carrier for each roller and its arbor, means for mounting the rollers and arbors in the carriers so that the carriers may have a limited movement with respect to the rollers in the direction of the axes of the latter, means for universally supporting the carriers so that each carrier may swing in a plane including the carrier pivot and the roller axis and rotate about an axis in that plane, control levers, one for each roller, swiveled to the carrier, each lever having an arm coupled to the arbor for moving the carrier axially with respect to the arbor and thereby causing it to swing and incline the roller, and an actuator common to said levers and operating through them to swing the carriers simultaneously and uniformly.

7. A combination as defined in claim 6 wherein the actuator for the control levers consists of a movable collar disposed coaxially between the races.

8. In a variable speed toroidal race and roller power transmitting mechanism, a roller having an axially bored arbor; a carrier in which the arbor is mounted so as to allow relative movement of carrier and arbor lengthwise of the latter; means for pivotally mounting the carrier so that it may swing in a plane including the carrier pivot and roller axis and thereby move along said arbor and incline the roller; a control pin slidably fitting in the bore of the arbor and attached to the carrier to partake of the movements thereof; a control lever slidingly fulcrumed on the arbor and pivoted to said control pin, whereby operation of the lever will move the carrier axially of the arbor and thereby incline the roller, and an actuator for the control lever.

9. A combination as defined in claim 8 wherein the control pin projects beyond the arbor at the end opposite that to which the control lever is pivoted, and means on the carrier engaging said pin to permit relative rotation but prevent axial movement of the pin with respect to the carrier.

10. A combination as defined in claim 8, in which the arbor has a bore communicating with a counterbore and the control pin is provided with a piston-like enlargement slidable in said counterbore.

11. A combination as defined in claim 8, in which damping means is arranged to react between the pin and the arbor.

12. A combination as defined in claim 8 in which said lever is a bell crank lever having its power arm substantially in line with the control pin when the axis of the roller lies in an axial plane including the race axis and roller center as in normal operation.

13. In variable speed toroidal race and roller power transmitting mechanism; a roller having an axially bored arbor provided at one end with a control flange having a circular edge; a roller carrier in which the arbor is mounted so as to allow relative movement of carrier and arbor along the axis of the latter; means for pivotally mounting the carrier to permit it to swing in a plane that includes its pivot and the roller axis; a control pin slidably mounted in the bore of the arbor, and attached to the carrier to partake of the movements thereof; a bell crank control lever pivoted to the control pin and having the end of one arm attached slidingly to the edge of said control flange, and an actuator engaging the end of the other arm.

14. A combination as defined in claim 13 wherein the control pin is free to rotate about its axis and the control lever has a hook-like transversely grooved end slidingly engaging the edge of said control flange whereby the latter is adapted to rotate with respect to said lever, and the carrier is provided with stops disposed on opposite sides of the axis of said arbor in the path of movement of said grooved lever end.

15. A combination as defined in claim 13 in which the actuator for the control lever is movable parallel with the race axis and grooved transversely of the race axis to receive the end of the power arm of said lever.

16. In a variable speed toroidal race and roller power transmission mechanism, a master roller having an axially bored arbor; a carrier in which the arbor is mounted so as to allow relative movement of carrier and arbor lengthwise of the latter; means for pivotally mounting the carrier so that it may swing in a plane including the carrier pivot and the roller axis, and thereby move along said arbor and incline the roller, a control pin slidably fitting in the bore of the arbor and attached to the carrier to partake of the movements thereof, said pin having a protruding inner end, a control lever slidingly fulcrumed on the arbor at the outer end of the latter and pivoted to the outer end of said control pin; an actuator for said lever, a follower-roller and carrier therefor; an actuator for effecting ratio adjustment of said follower-roller engaged by the protruding inner end of said master-roller control pin for inclining said follower roller in response to the movement of said follower-roller actuator effected by said master roller control pin.

JOHN O. ALMEN.